United States Patent [19]
Fredholm et al.

[11] Patent Number: 5,885,315
[45] Date of Patent: Mar. 23, 1999

[54] METHOD FOR FORMING GLASS SHEETS

[75] Inventors: Allan M. Fredholm, Mennecy; Claude F.M. Gille, Bougligny; Gilbert D. Pujol, Dammarie Les Lys, all of France

[73] Assignee: Corning Incorporated, Corning, N.Y.

[21] Appl. No.: 745,117

[22] Filed: Nov. 7, 1996

[30] Foreign Application Priority Data

Nov. 22, 1995 [FR] France .................................. 95 13877

[51] Int. Cl.⁶ .......................... C03B 21/00; C03B 23/00; C03B 13/00; C03B 29/00
[52] U.S. Cl. ................... 65/102; 65/106; 65/253; 65/273
[58] Field of Search .................... 65/63, 64, 102, 65/106, 111, 253, 254, 273, 93, 94; 264/175

[56] References Cited

U.S. PATENT DOCUMENTS

| | | | |
|---|---|---|---|
| 1,766,680 | 6/1930 | Parham | 65/253 |
| 1,772,072 | 8/1930 | Drake | 65/254 |
| 1,818,153 | 8/1931 | Nobbe | 65/254 |
| 2,140,213 | 12/1938 | Tegarty | 65/106 |
| 2,983,026 | 5/1961 | Skalko | 65/102 |
| 3,701,644 | 10/1972 | Frank | 65/106 |
| 4,139,359 | 2/1979 | Johnson et al. | 65/107 |
| 5,224,978 | 7/1993 | Hermant et al. | 65/94 |

FOREIGN PATENT DOCUMENTS 48-20602 B   6/1973   Japan .

OTHER PUBLICATIONS

Introduction to Ceramics, by Kingery et al. p. 760, 1976.
Chemistry of glasses, by A. Paul, p. 77, 1982.
N.T.I.S. Technical Notes, No. 10, Oct. 1984, Part G, "Fabrication of Structural Cellular Glass".

*Primary Examiner*—Peter Chin
*Assistant Examiner*—Jacqueline A. Ruller
*Attorney, Agent, or Firm*—Robert L. CArlson; Scott S. Servilla

[57] ABSTRACT

A glass ceramic or glass-ceramic sheet is formed by progressively reducing the thickness of the sheet by passing the sheet between successive pairs of counterrotating rollers. The average viscosity of the sheet is maintained between $5 \times 10^4$ and $10^9$ P during the sheet forming operation.

6 Claims, 3 Drawing Sheets

METHOD FOR FORMING GLASS SHEETS

FIELD OF THE INVENTION

The present invention pertains to a process for forming a sheet of vitreous material by pressing it between counterrotating rollers to reduce the thickness of the sheet to a predetermined thickness, at least locally. The present invention also pertains to a device for implementing this process.

BACKGROUND OF THE INVENTION

In the glassmaking industry, there is such a known process in which glass in viscous form is passed between two counterrotating rollers whose separation is the desired thickness of the sheet of glass which exits from between these rollers. The contact of the sheet with these rollers causes significant cooling of the sheet, at least on its surface. In fact, it is not possible to heat the rollers to the temperature of the glass to prevent its cooling, because such heating would cause the glass to stick to the rollers.

When the sheet of glass exiting from between the rollers is of a substantial thickness, the cooling due to the rollers is significant at the level of the "skin" of the sheet, and the glass then takes on a high viscosity in the vicinity of this skin, while the core of the sheet remains warmer and therefore less viscous. Subsequent cooling of this fluid core causes the core glass to shrink more than the cooler "skin" of the glass. This results in the development of stresses in the sheet, which can undesirably deform its structure, particularly when the sheet of glass is to be marked or imprinted with designs which must be positioned and executed with great precision.

When the sheet of glass exiting from the rollers is very thin (thickness less than 1 mm, for example), the cooling due to the rollers may extend through the entire thickness of the sheet. This sheet is then at too low a temperature to be taken into a subsequent operation of forming by pressing, for example. In addition, the minimal thickness of the sheet to be obtained at one time is limited to about 0.5 mm.

There are known processes for the manufacture of sheets of glass other than forming under pressure, such as the so-called "float glass" process or the processes known by the names of "fusion draw" or "down draw." The float glass process may involve unacceptable contamination with tin in certain applications. The other two are processes with a low production yield which also do not permit the use of glass which is easily devitrified. None of these three processes permits the production of sheets of glass with designs cut into the surface or through the entire thickness.

Currently, there is a need for a process for manufacturing glass sheets which can produce a shaped or structured sheet with great precision in its thickness and/or in the texture of its surfaces, this process also assuring a high-yield production compatible with manufacturing costs that are attainable for products intended for a mass market.

SUMMARY OF THE INVENTION

In the present invention, sheets of a vitreous material, such as glass, ceramic, or glass-ceramic materials, are formed by pressing the material in viscous form between counterrotating rollers to reduce at least locally the thickness of the sheet to a predetermined thickness. This process is noteworthy in that the thickness of the sheet is progressively reduced by a succession of passages of this sheet between counterrotating rollers, maintaining the average viscosity of the sheet between $5 \times 10^4$ and $10^9$ P prior to the glass attaining its final shape.

As indicated below, the progressive reduction in thickness and the control of viscosity of the material used by the present invention enables the forming of a sheet of vitreous material in small steps, allowing it to take on a predetermined shape and/or structure, without disorganization or any other parasitic disturbance resulting from the operations performed.

According to one embodiment of the present invention, the average viscosity of the sheet of vitreous material is maintained in the range defined above before each passage between rollers. These rollers then work a material which is sufficiently consistent and homogeneous so that differential shrinkage rates do not disturb its geometry during cooling.

Advantageously, according to the invention, the average viscosity of the sheet is adjusted by heating it between successive passages between the counterrotating rollers, either by addition of external thermal energy, or by diffusion of the thermal energy contained in the core of the sheet toward the two opposite surfaces.

In particular, the invention enables the formation of a sheet of vitreous material having on at least one of its two surfaces, a two-dimensional network of congruent cavities. For this purpose, a sheet of the material is passed between a succession of pairs of counterrotating rollers, at least some of which have shaped points which progressively cut the cavities by penetrating into the cavities cut by the preceding pair of rollers.

In one embodiment used to make control panels for a cathode ray flat screen image display, a two-dimensional network of cavities is cut on each surface of the sheet, with each cavity of one of the networks being coaxial to one cavity of the other network, and the bottoms of the cavities of a network are pierced in such a way that they open into those of the other network. The resulting sheet is then provided with a network of electrodes to form the control panel in question.

The present invention also provides a device for the implementation of this process, this device including a) means for making a sheet of a vitreous material in viscous form between counterrotating rollers which can reduce its thickness, at least locally, with each passage, and b) means for keeping the average viscosity of the sheet between $5 \times 10^4$ and $10^{7.6}$ P at least before the last passage between the rollers.

Other characteristics and advantages of the present invention will be apparent from reading the following description and upon examination of the attached drawings.

DETAILED DESCRIPTION OF THE INVENTION

Figure 1:
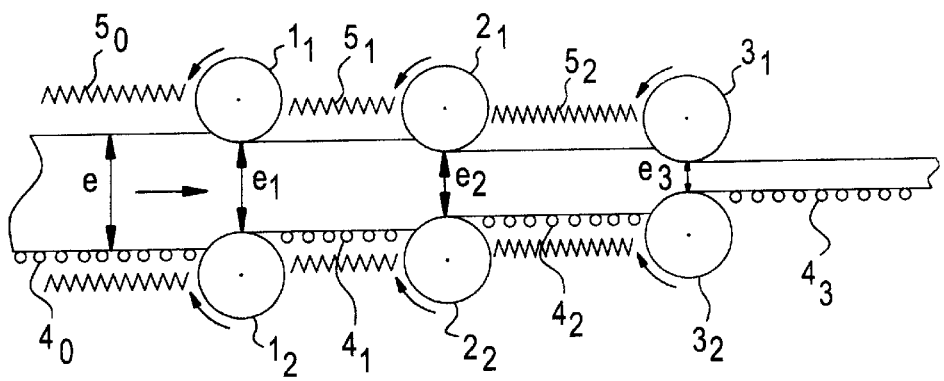
FIGS. 1 and 2 represent, respectively, a first and second embodiment of a forming device in accordance with the invention.

FIG. 1 of the attached drawing shows a first embodiment of a device using the forming process according to the invention. This device includes essentially several pairs of counterrotating rollers $1_1$, $1_2$; $2_1$, $2_2$; $3_1$, $3_2$; . . . possibly driven by motors (not shown) and defining a generally flat and rectilinear path for a sheet of a vitreous material such as glass, passing between the rollers of each pair. The sheet of glass F which passes between the rollers of the first pair $1_1$, $1_2$, for example, exits an oven which delivers it in viscous form. It is supported by a conveyer $4_0$ up to the first pair of rollers $1_1$, $1_2$, then by other conveyers $4_1$, $4_2$, $4_3$, between the other pairs of rollers and at the exit of the last pair $3_1$, $3_2$. This conveyer typically comprises rollers, as shown, or air cushions.

The forming rollers are made, for example, of a refractory metal alloy. The rollers of each pair, $1_1$, $1_2$; $2_1$, $2_2$; $3_1$; $3_2$ are separated by a distance of $e_1$, $e_2$, and $e_3$, respectively. This distance is gradually reduced so that the sheet of glass F with thickness e which enters into the device has its thickness reduced progressively ($e>e_1>e_2>e_3$) as far as thickness $e_3$, the distance between the rollers $3_1$, $3_2$. As indicated below, the process of forming according to the invention makes it possible to form sheets of glass of different thicknesses, particularly very thin ones, as small as 0.2 mm, for example.

The sheet F in viscous form which exits the oven has a thickness e which may be substantial. According to the invention, this thickness is gradually reduced in small steps to avoid the problems of differential shrinkage mentioned in the introduction to this description. The angle of contact between the surfaces of the sheet and the rollers may be limited in this way, as may be the cooling of the skin of the sheet. The progressive thinning of the sheet obtained with limited angles of contact also makes it possible to reduce the degradation of the surface condition of the sheet in contact with the rollers. Again according to the invention, this limited cooling can be compensated by heating this skin with heating means $5_1$, $5_2$, installed between two pairs of consecutive rollers. Additional heating means $5_0$ can be provided at the entrance of the device. As a variant, when the core of the sheet has remained less viscous, and therefore hotter, than the skin, the reheating of the skin may occur by diffusion of the heat from the core to the skin, and the diffusion time can be controlled by regulating the flow of glass and an appropriate spacing of the pairs of rollers.

Because of the controlled heating of the skin of the sheet, it is possible to reestablish the sheet in a state in which is has at all points a sufficient viscosity so that the forming it undergoes at the time of its last cooling does not cause the appearance of stresses due to significant differential shrinkage rates between the core and the skin that might disturb its internal structure. In connection with FIGS. 3–7, applications will be described which make use of this advantageous characteristic of a sheet of glass formed by the process according to the invention.

Figure 2:
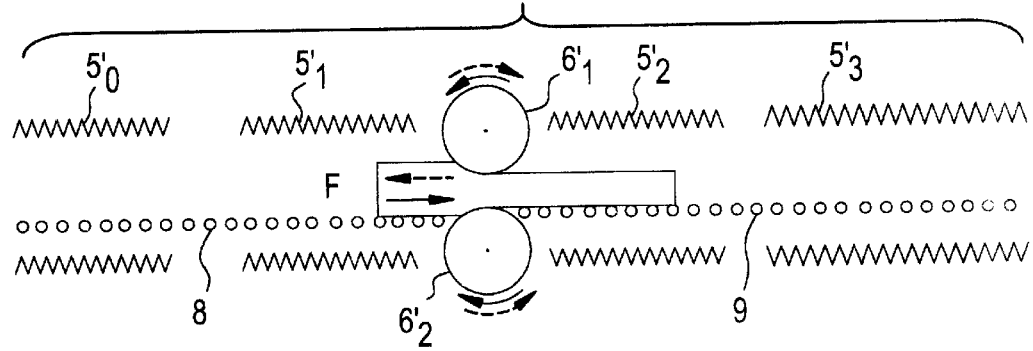

FIG. 2 shows a variation of the device according to the invention which has only a single pair, $6_1$, $6_2$, of forming rollers, to reduce the thickness of a plate or sheet of class F with a finished length carried by means of conveyance 8, 9 arranged on either side of the rollers. A power unit (not shown) acts on the rollers $6_1$, $6_2$ and/or on the means of conveyance 8, 9 to move the sheet back and forth between these rollers, whose separation is progressively decreased with each passage of the sheet by the control means, not shown. Sources of heat are located on the path of the sheet F. Thus one finds, successively, a preheating zone $5'_0$, heating zones $5'_1$ and $5'_2$ on either side of the rollers, and a postheating zone $5'_3$.

The sheet to be treated arrives in zone $5'_0$ where it is preheated to a temperature higher than the annealing temperature. It then passes into zone $5'_1$, where it is reheated so that its viscosity will decrease below $10^9$ P, and then makes several back-and-forth passages through the space between the rollers $6_1$, $6_2$ between zones $5'_1$, and $5'_2$, with concomitant reduction in the space between the rollers until the sheet reaches a predetermined thickness. It is then evacuated after staying for some time in zone $5'_3$, while another sheet enters the device to be treated.

The device of FIG. 2 is adapted to production volumes which are too limited to justify a continuous production such as the one of the device in FIG. 1, or to productions of melted glass with an output which is too limited to be adaptable to a continuous forming process. It is also appropriate for glass production requiring stages of preliminary conditioning such as polishing, assembly of plates or sheets of glass, thermal treatment for the development of special properties, microstructures, or for the diffusion of several different glass compositions.

As a variation, it would be possible to use a device similar to that of FIG. 2 but having several pairs of rollers between which the sheet of glass passes back and forth.

Figure 3:
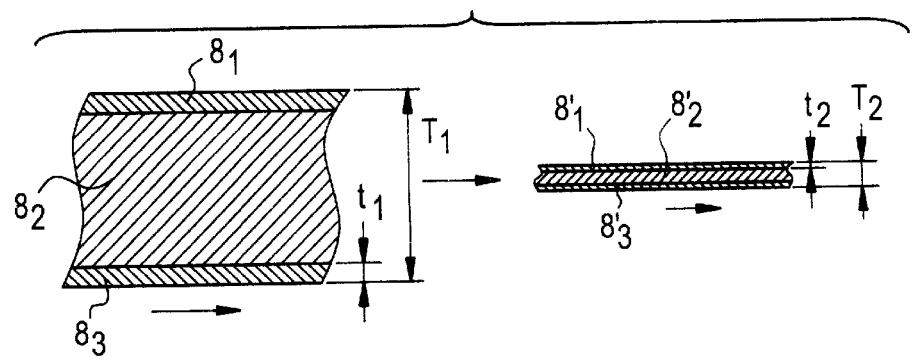
FIGS. 3, 4, 5, and 6 are diagrams illustrating various applications of a process in accordance with the invention.

FIGS. 3–7 illustrate various applications of the process according to the invention, implemented with the aid of the device of FIGS. 1 and 2. Thus, FIG. 3 illustrates the creation of a sheet of glass having three layers of superimposed glass, two layers of "skin" $8'_1$, $8'_2$, surrounding a core layer $8'_3$, by reduction of the thickness of a thicker sheet ($8_1$, $8_2$, $8_3$). It is known that such a glass structure makes it possible to obtain, by an appropriate choice of thermal expansion coefficients of the glass composing the core and the skin of the sheet, a sheet with high mechanical resistance.

If the total initial thickness of the sheet ($8_1$, $8_2$, $8_3$) is $T_1$ and skin thickness is $t_1$, after forming a sheet of glass can be obtained with a total thickness of $T_2$ and skin thickness $t_2$ such that $T_1/t_1=T_2/t_2$, with the ratio of the thicknesses remaining undisturbed by the progressive forming process according to the invention. Thus, one obtains, from a sheet of glass with thickness $T_1=3$ mm, for example, a sheet of glass with great mechanical resistance having a thickness of 0.7 mm, for example, the thickness of the two layers of skin representing 5 to 10% of the total thickness of the sheet, for example.

Figure 4:
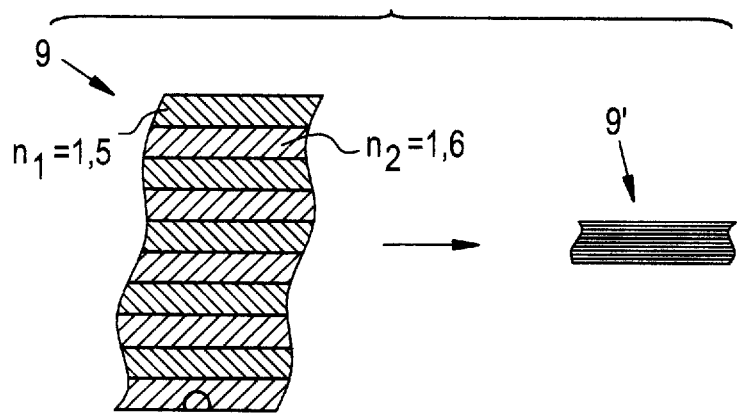

FIG. 4 shows an embodiment of the process according to the invention for the creation of sheets of multilayer glass having light polarizing properties, for example. It involves making a sheet 9' of glass having, for example, ten alternating layers of two glasses with different indices of refraction $n_1$ and $n_2$, with $n_1=1.5$ and $n_2>1.6$, for example, with the thickness of an elementary layer being between 0.05 and 0.1 mm, for example.

To obtain a sheet with so fine a structure it is possible, according to the invention, to start with a structure 9 of a thicker glass sheet, whose thickness is reduced until the desired thickness is obtained for the sheet 9'. The starting sheet 9 may be made up of ten layers of glass, each with a thickness of 1 to 2 mm.

Figure 5:
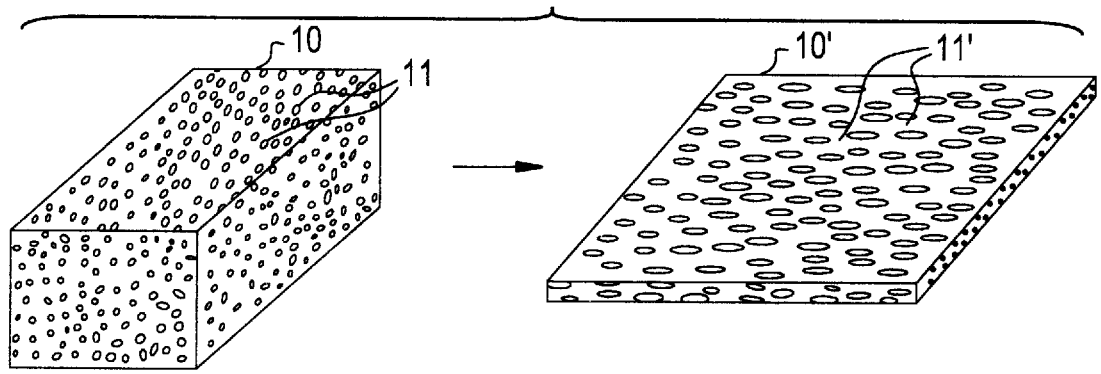

FIG. 5 illustrates in schematic form the creation of a sheet of glass 10' containing particles 11' showing pronounced acicularity in the direction of the lamination of the sheet between the pairs of rollers of the device according to the invention. One starts with a thicker sheet or plate, 10, which is charged with largely spherical particles, and contains at least one metallic constituent, which deforms as it is elongated during lamination of the sheet 10 between the rollers, parallel to the direction of lamination. Such oriented particles give the sheet 10 optical polarization properties.

Figure 6:
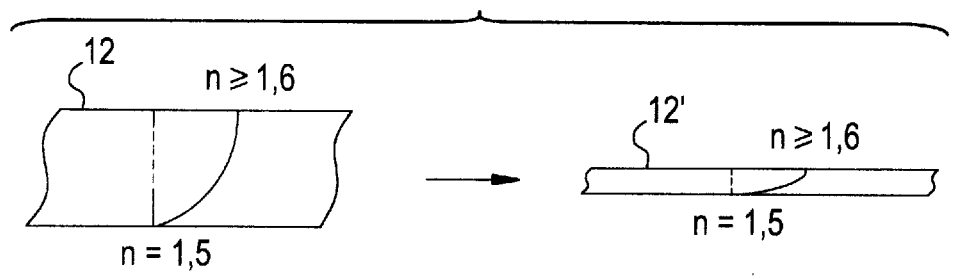

In FIG. 6, a sheet 12 with a refractive index gradient n depending upon its thickness, which is laminated in the device according to the invention, is used to obtain another sheet 12', which is thinner and has a predetermined thickness following which find the same index gradient varying, for example, from n=1.5 on one surface of the sheet to n=1.6 on the other surface of the sheet. The graph of the index gradient of the sheet 12' is deduced from that of sheet 12 by the geometric transformation called "affinity" in the ratio of the thicknesses of sheets 12 and 12'.

In light of the applications of the invention mentioned in connection with FIGS. 1–6, it now appears that it offers a progressive thinning of the starting material in small steps of limited amplitude, applied to a material which is sufficiently viscous to be worked without this working disturbing the general structure of this material.

In working with a homogeneous material (see FIGS. 1 and 2), understand that the final thickness of the sheet depends upon the distance separating the first pair of rollers. It should no longer be possible then for the shape of the sheet to be disturbed by differential shrinkage rates due to a pronounced lack of homogeneity in the temperature and therefore in the viscosity of the material, for example. This is why it is imperative in this case that the average viscosity of the material used be in a limited range, negating the effect of these differential shrinkage rates. According to the invention, the viscosity of the glass is maintained, at least during the last passage between rollers, between $5 \times 10^4$ and $10^9$ P.

When the structure of the starting sheet is heterogeneous (case illustrated in FIGS. 3–6), this condition concerning the average viscosity of the sheet should be advantageously respected with each passage between the rollers so that the work performed on the sheet does not disturb the general structure of the sheet, or the distribution of a property such as the index of refraction, for example, in this thickness of this sheet, at least when wish to preserve this general structure in the final thinned sheet.

Figure 7A:
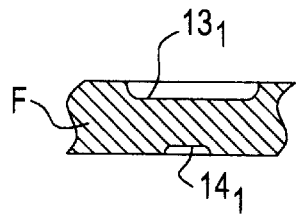
FIGS. 7 and 8 are diagrams illustrating another application of the process according to the invention, in making control panels for cathode ray flat screen image displays.
Figure 7B:
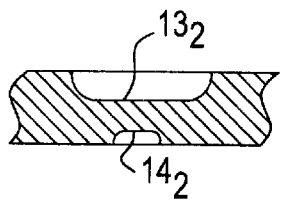
Figure 7C:
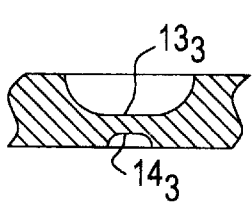
Figure 7D:
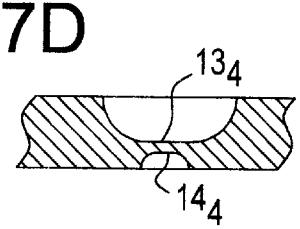
Figure 7E:
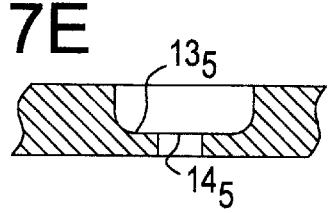

One now refers to FIGS. 6 and 7, which illustrate another application of the present invention, in the making of a sheet of glass cut with a two-dimensional network of holes or, as shown in FIG. 7E, with cavities $13_5$ opening onto the surface and whose bottom part is pierced by at least one hole $14_5$ with a smaller diameter opening onto the other surface.

Sheets pierced by such a dense network of holes or holes/cavities can be used in making "control panels" for a cathode ray flat screen image display. Such screens and such panels are described on pages 202 ff of the work entitled "Flat panel displays and CRT" by Laurence E. Tanner, Jr., published by Van Nostrand Reinhold Company, New York, 1985. A control panel is made up of a thin sheet of glass penetrated by a regular two-dimensional network of holes and provided with a network of electrodes controlling the passage of electron beams through these holes, for the display of an image on a screen, pixel by pixel.

Thus, it is a matter of making a sheet of glass whose surface is cut with cavities opening onto the other surface by at least one hole, the space of these cavities being on the order of the pixels of the image to be displayed on the screen (or a multiple of it), which might reach a fraction of a millimeter, while the thickness of the sheet is typically on the order of 0.4 mm.

According to the invention, as illustrated in FIG. 7, such a sheet can be made by cutting progressively into it a two-dimensional network of cavities on each surface of the sheet, with each cavity of a network being coaxial to a cavity of the other, as shown. Alternatively, the cavities may not be coaxial, and may be arranged to open into each other at the end of the cutting operation. Thus, as shown as an example in FIG. 7, a sheet of glass F in viscous form passes through five stages A to E in each of which is it cut with cavities $13_i$, $14_i$ (i=1 to 5) from both of its surfaces, and these cavities are progressively deepened.

Figure 8:
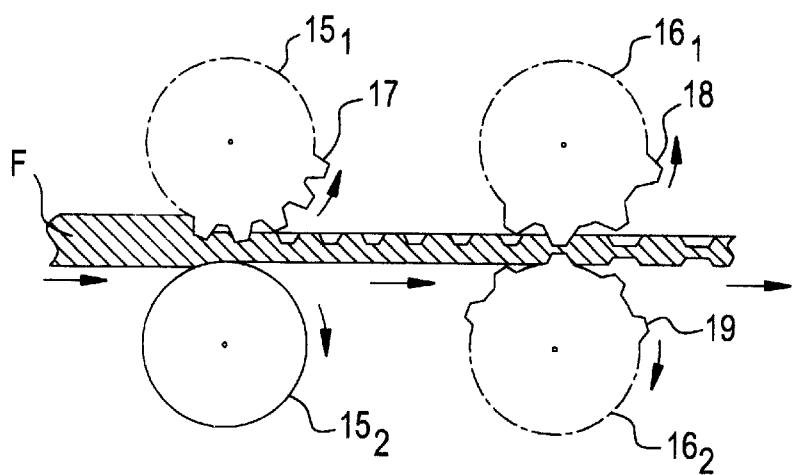

FIG. 8 shows in schematic form a part of the device according to the invention which is suitable for making such a sheet. The device includes five pairs of rollers, of which only two successive pairs are shown, $15_1$, $15_2$ and $16_1$, $16_2$, for the sake of clarity.

The rollers which cut the cavities $13_i$, $14_i$ are equipped with points such as 17, 18, 19 distributed over their cylindrical surfaces at intervals chosen as a function of the interval between the cavities to be formed on the sheet. These rollers can be made by traditional techniques of masking and chemical etching. The points 17, 18 of two successive rollers $15_1$, $16_1$ acting on the same surface of the sheet are of a height which increases from the entry rollers to the exit rollers.

It is essential for the rotations of the rollers of the same pair, and of two successive pairs, to be dependent upon each other, so that the points of one pair of rollers fall into the cavities cut by the points of the preceding pair in order to deepen them without making them off-center.

Of course, as indicated above, heat sources (not shown) can be installed between the successive pairs of rollers to maintain the average viscosity of the sheet in the range defined above.

The cutting of cavities $13_i$, $14_i$ causes a reflux of glass into the spaces separating the points, and this reflux can cause an overall increase in the thickness of the sheet, which is shown between the rollers $16_1$, $16_2$ of the device of FIG. 8. According to the invention, the distance between these rollers is controlled so that they can accommodate this reflux of material. Of course, it should be evaluated so that the nominal thickness desired for the sheet coming from the device is obtained.

As a variant, the reflux of material may affect the thickness of the sheet only locally, around the cavities, when the volume of material pushed back by the points is small.

Thus one can obtain, at the exit of the device, a sheet cut with cavities $13_4$, $14_4$ which do not connect (FIG. 7D) or cavities $13_5$, $14_5$ which do connect (FIG. 7,E).

A sheet cut with cavities such as $13_4$, $14_4$ requires less working precision, and may be preferred for this reason. The thin wall separating the cavities $13_4$, $14_4$ can then be made to burst, for example, by blowing with abrasive powder. The resulting sheet is then provided with the network of electrodes required for the control of electron beams by any known process for this purpose.

The process according to the invention allows for continuously creating the sheet of glass required for a reduced cost in comparison with currently used techniques, which proceed by forming of full sheets, masking and cutting of cavities by blowing of an abrasive powder, or chemical etching through the holes of the mask.

It now appears that the forming process according to the invention makes it possible to realize the goals set, specifically, to provide a high-precision forming with good production yield of thin sheets of glass. These sheets have good surface condition, the relatively "cold" glass worked in small steps according to the invention is, in fact, relatively immune to parasitic replications which the rollers according to the invention might [otherwise] imprint upon them.

Of course, the invention is not limited to the embodiments described and represented, which are given only as an example. Thus the invention makes it possible to produce sheets of glass cut with a network of cavities on only one surface or holes with a fixed diameter passing through its entire thickness, or sheets of glass with any desired texture.

The invention has been described in detail with particular reference to preferred embodiments, but it is understood that variations may be effected by those skilled in the art without departing from the spirit and scope of invention which is defined by the following claims.

What is claimed is:

1. A method of forming a sheet of a glass, ceramics, or glass-ceramics material, the method comprising:

pressing a viscous sheet of glass, ceramic, or glass-ceramic material between a plurality of pairs of counter-rotating rollers to thereby reduce the thickness of the sheet to a predetermined thickness, said thickness being progressively reduced by contact with said pairs of rollers and at least one pair of said rollers comprises rollers having a plurality of male forming members thereon to form recessed cavities on both sides of said sheet, and maintaining the average viscosity of the sheet between $5 \times 10^4$ and $10^9$ poise during said pressing step.

2. The method of claim 1, wherein said maintaining step comprises heating the sheet between successive pairs of counterrotating rollers using an external thermal energy source.

3. The method of claim 1, wherein said male forming members have a width of less than 1000 microns.

4. The method of claim 1, wherein the male forming members on said first roller cooperate with the male forming members on the second roller so that the said first set of recessed cavities are coaxial with said second set of recessed cavities.

5. The method of claim 4, wherein said pressing step results in the formation of thin glass areas corresponding to the location of said first and second sets of recesses, and said method further comprises removing said thin glass areas.

6. The method of claim 5, wherein said removing step comprises sandblasting said glass.

* * * * *